Patented Jan. 31, 1933 1,896,049

UNITED STATES PATENT OFFICE

CLARENCE C. ZEIGLER, OF MAPLEWOOD, NEW JERSEY, ASSIGNOR TO SWIFT & COMPANY, OF CHICAGO, ILLINOIS, A CORPORATION OF ILLINOIS

NEW GELATIN PRODUCT AND METHOD OF PREPARING THE SAME

No Drawing. Application filed May 28, 1930. Serial No. 456,827.

This invention relates to a new gelatin product for making gelatin desserts and to a method of preparing the same. More particularly, the invention relates to a new gelatin product in tablet form made up of granulated gelatin, granulated sugar, powdered fruit acid, flavor and color, in the form of a compressed tablet bound together into a coherent mass with a bond made up mainly or entirely of sugar.

Gelatin desserts are commonly manufactured in powdered or granular form. Such products are usually hygroscopic, and, particularly where they absorb moisture from the atmosphere, form cakes in the package. Such caking of powdered or granulated gelatin dessert is objectionable and a considerable amount of commercial powdered or graulated gelatin dessert is returned to the manufacturer because of this objectionable caking.

The present invention provides an improved gelatin product which is prepared in tablet form and which is free from objectionable caking tendencies.

In making the new gelatin product I use commercial granulated gelatin (containing about 10% of moisture) together with granulated sugar, powdered fruit acid, flavor and color in suitable proportions. Invert sugar may be incorporated in the mixture. The flavor may contain enough liquid to cause the particles to adhere when subjected to pressure or water may be added to dissolve enough of the sugar to form a syrup which moistens the mass sufficiently to cause it to cohere when pressed into cakes. Sugar solution or syrup may be added for this purpose. A small amount of a dilute aqueous solution of gelatin can be similarly used. If water or other liquid is added in addition to that contained in the flavor the amount added is limited so that the mixture can be readily handled and pressed into coherent cakes. These cakes are then subjected to drying to remove the excess moisture and to form a solid binding material throughout the tablet made up mainly of sugar. The resulting dried product will be a compressed cake or tablet containing the granulated gelatin, granulated sugar, powdered fruit acid, flavor and color bound together in the form of a coherent tablet by the sugar binder.

When the resulting tablet is added to hot water it readily dissolves, i. e. in a period of time comparable with that required for the dissolving of powdered gelatin desserts which is in the neighborhood of 1½ to 2 minutes. By making the tablets of suitable size for individual desserts one tablet can be dissolved in the proper amount of water to make the individual gelatin dessert, or several tablets, for example six tablets, may be dissolved in a larger amount of water, for example a pint of hot water, to make a larger amount of dessert suitable for about six individual portions.

The invention will be further illustrated by the following specific example, but it will be understood that the proportions can be somewhat varied, and the procedure followed can also be somewhat varied. The parts are by weight.

70 parts of commercial edible gelatin in granular condition (containing about 10% of moisture, and having a jelly strength of about 225 grams when tested with a Bloom gelometer) are mixed with about 480 parts of granulated sugar, about 14 parts of fruit acid (such as tartaric, citric, malic, or mixtures, etc.) and suitable amounts of flavoring and coloring ingredients. A solution is made of about 60 parts of invert sugar (containing around 25 to 30% water) and about 10 parts of water, and the resulting solution, with which the flavor and color may be incorporated, is mixed with the gelatin, granulated sugar and fruit acid in a suitable mixing machine.

The resulting mixture, containing the other ingredients moistened by the added sugar solution, is then pressed into cakes or tablets which are preferably made of such size that each tablet will make an individual gelatin dessert. The subjecting of the mixture to pressure forms the mixture into a coherent compressed tablet. The tablet is then removed from the mold and dried to remove sufficient water to form a dry tablet. The other ingredients are bound together by binder made up mainly of sugar. The cakes or tablets are of a porous character readily penetrated by water and when added to boiled water in the manner commonly employed in dissolving powdered gelatin desserts the tablets dissolve in a similar period of time, i. e., in a period which does not exceed about 1½ to 2 minutes. In tablets made according to the above formula, using an invert sugar, this sugar appears particularly advantageous in giving a compressed cake or tablet having the desired properties, the bond in such case being made up at least in part of the invert sugar remaining after the drying of the tablets or cakes.

Each tablet made according to the above example may be of about one-half ounce in weight or of such size that six tablets will weigh about three and a quarter ounces. Six of the above tablets can be dissolved in a pint of hot water to form sufficient gelatin dessert for about six portions or each tablet can be separately dissolved in the proper amount of water to make an individual dessert.

The new compressed tablets of the present invention can advantageously be packaged by wrapping them in a moisture resistant wrapping such as a cellophane wrapping to protect them from the atmosphere and from contamination in handling. The individual tablets can be individually wrapped. The tablets when so wrapped present a pleasing appearance. Tablets so prepared and packaged are free from any objectionable tendency to stick together in the package, and, should some slight sticking occur, the tablets can readily be separated from each other. The tablets thus prepared have the flavor held therein in a manner which reduces or minimizes objectionable loss of flavor, the flavor being sealed in by the sugar bond and by the moisture-proof wrapper.

The preparation of the new product in tablet form enables any desired amount of dessert to be made from one portion to as many as desired. A package of six or twelve tablets can be used all at once, or a few tablets at a time, whereas the commercial packages of powdered gelatin desserts are not capable of ready subdivision to uniform portions to form desserts of uniform composition. Moreover, powdered gelatin, when the package is opened and partly used and the remainder left in the package, tends to cake together, particularly in moist atmosphere; whereas the new tablets of the present invention can be readily separated even after exposure to moist atmosphere, and thereby the proper amount of gelatin for a predetermined number of desserts is readily obtained.

It will thus be seen that the present invention provides an improved process of making gelatin dessert in tablet form in which the ingredients (the granulated gelatin, granulated sugar, powdered fruit acid, color and flavor) are mixed together with a limited amount of water or sugar syrup and formed into a coherent moldable mass which is then pressed into molds to form compressed coherent tablets, and these tablets are subsequently dried to form dry coherent tablets bound together mainly with a sugar bond. While, in the above example, a sugar syrup is used to moisten the dry ingredients, it will be understood that, when water is added, it will dissolve some of the sugar and form a syrup which acts in a similar way. It will further be seen that the new gelatin product is in the form of compressed coherent tablets containing the granular and powdered constituents (granulated gelatin, granulated sugar and powdered fruit acid) bound together with a bond made up mainly of sugar, which tablets, in a pressed and dried state, can be readily dissolved in hot water to make individual desserts or any desired number of portions.

It will be understood that the nature and proportions of the ingredients can be somewhat varied depending on such considerations as the particular kind of gelatin employed, the particular fruit acid or acids employed, and the character of flavor and color desired. A raspberry or strawberry flavored tablet will have an attractive red color, and when wrapped in a moisture resistant cellophane wrapping, or when several tablets are so wrapped, they present a pleasing appearance.

The present invention has the added advantage that tablets of assorted flavors can be wrapped together or individually wrapped and packaged together, thus making it possible for individual gelatin desserts of assorted flavors to be prepared from the same package, or, if desired, gelatin desserts of mixed flavors.

In referring to the bond between the gelatin, sugar and acid particles as made up mainly of sugar, I do not exclude the presence of other constituents which may contribute to the binding action. Thus, if a dilute gelatin solution is used in small amount and distributed throughout the particles of granular gelatin, granulated sugar and powdered fruit acid, it will coat and moisten the various particles and will dissolve some of the sugar, and, to some limited extent, the particles or granules of gelatin may absorb some of the added aqueous solution. When the mixture is compressed into tablets and subsequently dried the particles will cohere due to the resulting bond formed by compression of the moistened particles and by evaporation of water from the moistened surfaces. The bond in such cases will be largely a sugar bond but may be in part due to a bonding action of the small amount of gelatin added in aqueous solution. This amount, however, will be small as compared with the amount of powdered or granulated gelatin in the tablet.

In the specification "granulated" has been used in a broad sense as applied to sugar and gelatin to include crystalline sugar and gelatin in granules of varying size. Powdered sugar and gelatin are included insofar as the particles are of sufficient size to give satisfactory tablets when mixed with the other ingredients contemplated by this invention and compressed to form cakes.

The flavor is advantageously added dissolved in water. Organic solvents may be employed, however, and when it is necessary to add additional liquid to dampen the ingredients so that they will adhere when compressed, an organic liquid which is a solvent for either the sugar or gelatin may be employed, but water or an aqueous solution is ordinarily to be preferred.

I claim:

1. A new gelatin dessert in the form of compressed, coherent tablets containing granulated gelatin, granulated sugar, fruit acid, flavor and color, bound together in a compressed, coherent and substantially non-crumbling state by a bond made up mainly of sugar, said tablets disintegrating almost instantly in hot water and readily dissolving in hot water in a period of time not exceeding about 1½ to 2 minutes and each of said tablets containing the proper amounts of ingredients and in proper proportions for the preparation of an individual dessert.

2. A new gelatin dessert in the form of compressed, coherent tablets containing granulated gelatin, granulated sugar, invert sugar, fruit acid, flavor and color bound together in a compressed coherent substantially non-crumbling state by a bond made up at least in part of invert sugar, said tablets being porous and disintegrating almost instantly in hot water and readily dissolving in hot water in less than about 1½ to 2 minutes and each of said tablets containing sufficient ingredients and in proper proportions for an individual dessert.

3. A new gelatin dessert in the form of compressed, coherent tablets containing granulated gelatin, granulated sugar, fruit acid, flavor and coloring bound together in a coherent, compressed, substantially non-crumbling state with a binder made up mainly of sugar, said tablets being porous and hygroscopic and being enclosed in moisture resistant transparent wrappings said tablets disintegrating almost instantly in hot water and readily dissolving in hot water in a period of time not exceeding about 1½ to 2 minutes and each of said tablets containing sufficient ingredients and in proper proportions for an individual dessert.

4. A new gelatin dessert in the form of compressed coherent tablets each containing about 70 parts of granulated gelatin, about 480 parts of granulated sugar, about 60 parts of invert sugar, together with fruit acid, flavor and color said ingredients being bound together in a dry state into a porous, coherent mass by a bond made up at least in part of invert sugar, said tablets being hygroscopic and being enclosed in moisture resistant, transparent wrappings and said tablets disintegrating almost instantly in hot water and being readily soluble in hot water in less than about 1½ to 2 minutes' time.

5. The method of preparing gelatin desserts in tablet form which comprises mixing granulated gelatin, granulated sugar, fruit acid, flavor and color, incorporating in the mixture a regulated amount of sugar syrup so that the mixture is sufficiently moist to cause it to cohere when compressed without being moist enough to make it stick to the molds when compressed, compressing the mixture into tablets of such size that each tablet contains sufficient ingredients for an individual dessert with a sufficient amount of pressure to make the mixture cohere together into a coherent compressed tablet which, when dried, will be substantially non-crumbling, subsequently drying the tablets to form coherent, compressed, substantially non-crumbling tablets with the ingredients bound together with a bond made up mainly of sugar, which tablets are hygroscopic in character, and enclosing the dried tablets in moisture resistant, transparent wrappings, thereby producing tablets having the flavors effectively sealed within them and tablets which will readily dissolve in hot water in a period of time not exceeding about 1½ to 2 minutes.

In testimony whereof I affix my signature.

CLARENCE C. ZEIGLER.